United States Patent
Said et al.

(10) Patent No.: US 9,069,984 B2
(45) Date of Patent: Jun. 30, 2015

(54) ON-DEMAND AUTHORIZATION MANAGEMENT

(75) Inventors: Bare Said, St. Leon (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 569 days.

(21) Appl. No.: 13/334,009

(22) Filed: Dec. 21, 2011

(65) Prior Publication Data

US 2013/0167199 A1   Jun. 27, 2013

(51) Int. Cl.
| | |
|---|---|
| G06F 7/04 | (2006.01) |
| G06F 12/14 | (2006.01) |
| H04L 29/06 | (2006.01) |
| H04L 9/32 | (2006.01) |
| G06F 21/62 | (2013.01) |
| G06F 21/10 | (2013.01) |

(52) U.S. Cl.
CPC .......... *G06F 21/6218* (2013.01); *H04L 63/101* (2013.01); *G06F 21/10* (2013.01); *H04L 63/1416* (2013.01); *H04L 63/08* (2013.01)

(58) Field of Classification Search
CPC ... H04L 63/08; H04L 63/101; H04L 63/1416; G06F 21/6218; G06F 21/10
USPC ............................ 726/4, 22, 27; 713/165, 168
See application file for complete search history.

(56) References Cited

U.S. PATENT DOCUMENTS

2008/0091613 A1* 4/2008 Gates et al. ............... 705/59

* cited by examiner

*Primary Examiner* — Aravind Moorthy
(74) *Attorney, Agent, or Firm* — Mintz Levin Cohn Ferris Glovsky and Popeo, P.C.

(57) ABSTRACT

Methods and apparatus, including computer program products, are provided for authorization management. In one aspect, there is provided a computer-implemented method. The method may include receiving a request to authorize at least one user to at least one module of a system; mapping the received request to a semantic tag; processing, based on the semantic tag, the request to authorize the at least one user to determine whether to grant the at least one user access to the at least one module; and sending a response to the request to authorize the at least one user, wherein the response is in accordance with the result of the processing. Related apparatus, systems, methods, and articles are also described.

9 Claims, 5 Drawing Sheets

ON-DEMAND AUTHORIZATION MANAGEMENT

FIELD

The present disclosure generally relates to data processing and, in particular, authorization management.

BACKGROUND

Networked business applications including enterprise resource planning applications (and other business applications) have become prevalent and, as such, software makers have been forced to provide integrated business solutions via on-demand modules and/or on-premise. On-demand refers to locally using a business system which includes one or more modules executed in a cloud (e.g., accessing, via a network/Internet, another physical processor configured to provide the on-demand module(s)). On-premise refers to executing one or more modules of the business system locally. In some instances, the business system may comprise one or more modules (also referred to as components and/or systems) that are implemented on-premises, while other modules may be implemented on-demand. In any case, the use of on-premises and on-demand makes these business systems more valuable because of extended business functionality but at the same time more complex, which drives up the cost and complexity of ownership of the business systems.

SUMMARY

In one aspect there is provided a method. The method may include receiving a request to authorize at least one user to at least one module of a system; mapping the received request to a semantic tag; processing, based on the semantic tag, the request to authorize the at least one user to determine whether to grant the at least one user access to the at least one module; and sending a response to the request to authorize the at least one user, wherein the response is in accordance with the result of the processing.

In some implementations, the above-noted aspects may further include additional features described herein including one or more of the following. The at least one module may be implemented as at least one of an on-premises module and an on-demand module. The mapping may further include determining, based on an identity of the at least one user, a role for the at least one user. The received request may be mapped, based on the determined role, to the semantic tag. The detecting may further include detecting the segregation of duty violation across a plurality of modules including at least one on-premise module and at least one on-demand module. The at least one user access to the at least one module may be authorizes based on the processing and the detecting results, It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1A:
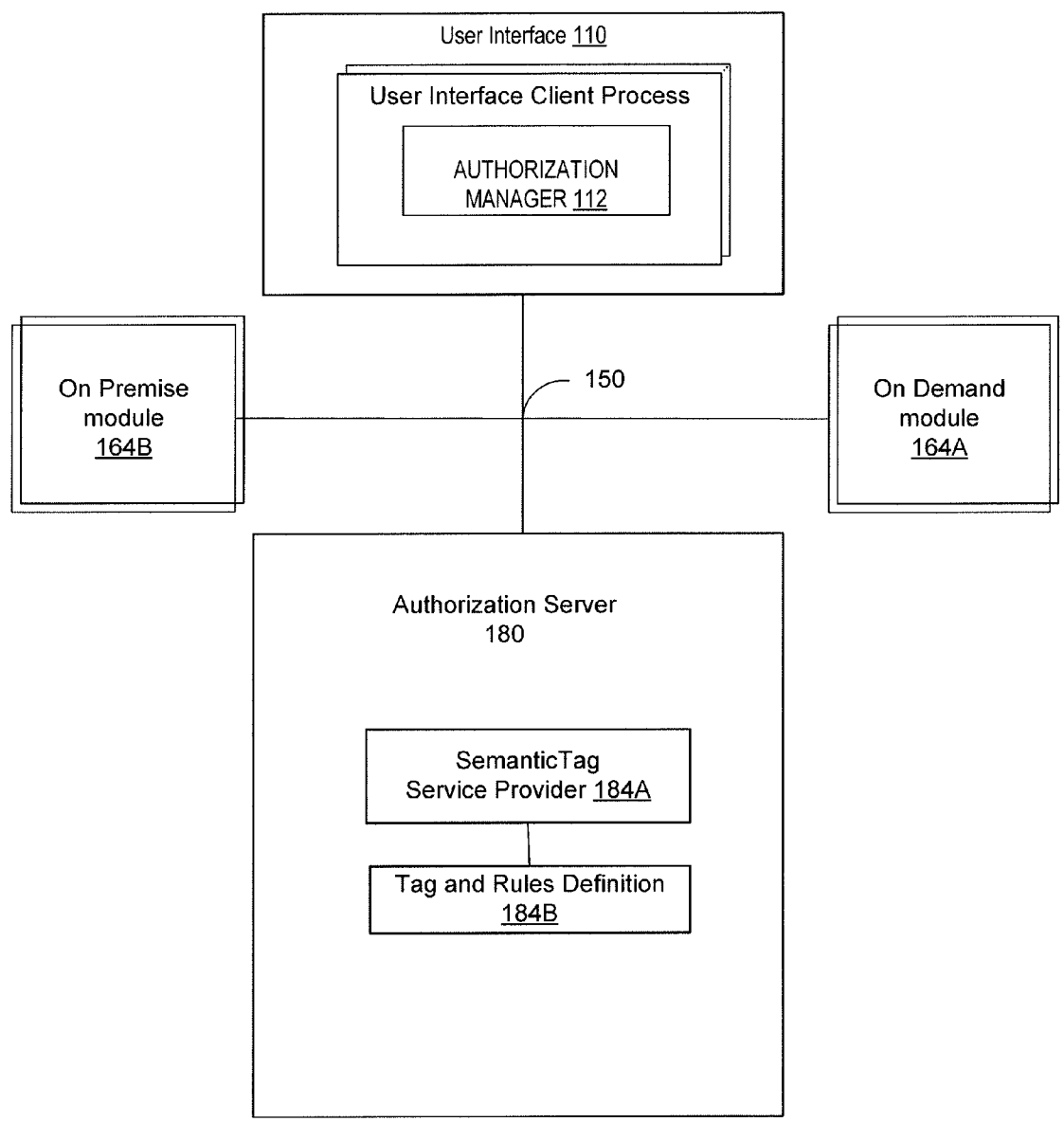
FIG. 1A depicts a block diagram of an example system for authorization management across system environments.

Like labels are used to refer to same or similar items in the drawings.

DETAILED DESCRIPTION

The subject matter described herein relates to authorization management in a business system including modules that are on-demand and/or on-premise. Authorization management refers to maintaining and monitoring authorization to access and/or use one or more modules of a business system. For example, system administrators may assign and manage the right to access a networked business system, or one or more module(s) therein, for each end-user of the networked business systems. Moreover, authorization management may be used to provide traceability, tracking, and compliance. For example, a networked business system for accounting may segregate the authorization for a first module to a first end user, but restrict authorization to access other modules in order to comply with best practices in accounting (e.g., standards dealing with fraud).

FIG. 1A depicts a system 100 including at least one user interface, such as user interface 110, coupled via a communication mechanism 150 (e.g., the Internet, a network, and the like) to at least one server, such as authorization server 180.

The user interface 110 may be implemented as an Internet browser, a thin client, and/or any other application allowing access to server 180. The user interface 110 may be implemented on at least one processor (e.g., a computer, tablet computer, mobile phone, smart phone, and the like) and at least one memory including code which when executed by the at least one processor provides the user interface 110.

In some implementations, an administrator of a business system, such as an enterprise resource planning system, and the like, may access system 100 via user interface 110. The user interface 110 may also include an authorization manager 112 to allow management authorizations. For example, the authorization manager 112 may be used to authorize users to each of the modules of the business system, maintain authorizations for each user of the modules of the business system, monitor authorizations for each user of the modules of the business system, configure the authorizations for each module of the business system, track access to each module of the business system, and the like.

The authorization server 180 may include a semantic tag service provider 184A and tag and rules definitions 184B. The authorization server 180 may authorize one or more users (or groups of users) based on semantic tags accessible via the semantic tag service provider 184A. For example, a first system may include an on-premise module 164B configured to processes invoices, and in the first system authorization is granted to a user based on a role, such as a user being assigned the role of invoice processor. And, a second system may include another module, such as an on-demand module 164B also configured for invoice processing but in the second system the authorization to access and/or use the on-demand component 164B is based on a work-center (e.g., accounting) rather than a specific user's role. In this example, the semantic tagging service provider 184A may include one or more rules at tags and rules definition 184B to map the tag "invoice processor" to the tag "accounting," so that the authorization server 180 can determine that an "invoice processor" in the first system and the "accounting" group of the second system may have same, or similar, authorizations to access and use similar modules. Moreover, the authorization may be provided across systems (e.g., across different systems, such as on-demand module 164A and on-premise module 164B).

The tag and rules definition 184B may include a plurality of rules to map between authorization schemes for different systems. In some implementations, tag and rules definition 184B may include rules to convert the authorization tags of a system into a common, semantic language, so that processing of authorizations and authorization management takes place in the common, semantic language. Moreover, tag and rules definition 184B may include additional rules to convert from that common, semantic language into another language scheme in order to provide an output to another system. In any case, the semantic tagging service provider 184A and tags and rules definition 184B may reduce, in some implementations, the complexity of authorizing different systems and/or different modules as the administrator can disregard the differences among the authorization schemes among different systems since the differences are handled by the semantic tagging service provider 184A and tags and rules definition 184B using a common, semantic language. In tags and rules definition 184B, a common set of tags representing business roles may be defined, and the business roles may be defined in the authorization system. An example of defining rules is shown at Table 1 below.

TABLE 1

| Invoice processor | Person responsible to create, clarify and release invoices | 1) create Invoice<br>2) Compare invoices<br>3) Release invoice<br>4) reject invoice, etc. |
|---|---|---|
| Sales Representative | Sales representative is a party in the sales force automation process. The sales representative user shall be able to manage accounts and contacts, enter sales opportunities and leads in the system, etc. | 1) create/update/delete contact<br>2) create/update account<br>3) create/update/delete leads<br>4) create/update/delete opportunities<br>5) Trigger sales order creation |

System specific authorizations mapping may be provided for each system participating in the networked business solution. An example of a local authorization mapping is depicted at Table 2 below for system A (e.g., on-demand module 164A) and system B (e.g., on-premise module 164B).
Table 2

TABLE 2

| Cental Authorizations | System A | System B |
|---|---|---|
| Sales Rep. | Sales Rep Work Center | Autho_object 3210_C_d_U<br>Autho_object366_c_u<br>Autho346c_u_d |

TABLE 2-continued

| Cental Authorizations | System A | System B |
|---|---|---|
| | | Autho621c_u_d<br>Autho553T__ |

Figure 1B:
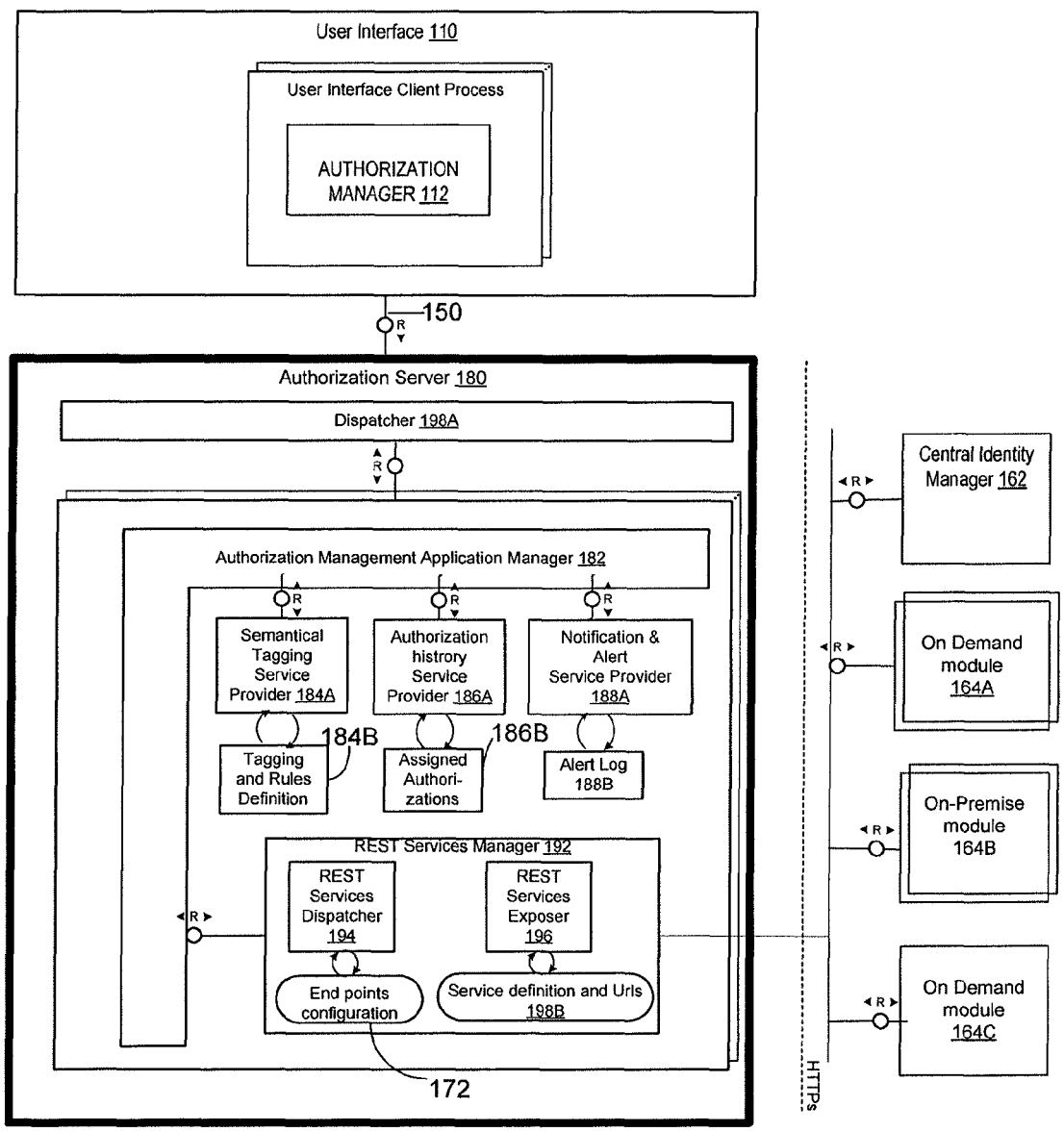
FIG. 1B depicts another block diagram of an example system for authorization management across systems environments.

FIG. 1B depicts a system 190. System 190 is similar to system 100 in some respects but includes additional features as noted below. System 190 includes user interface 110 coupled via communication mechanism 150 to authorization server 180, as noted above. System 190 may manage the authorization of one or more modules/systems, such as on-demand module 164A, on-premise module 164B, and on-demand module 164C. The system 190 may also include a central identity manager 162 for managing the identity of users accessing modules 164A-B and storing user information, such as assigned organization, job function, supervisor, phone number, and the like.

The authorization manager 112 may expose features and capabilities of the authorization server 180 to a user of authorization manager 112. In some implementations, the authorization manager 112 may provide one or more of the following functions: connectivity to the different modules (e.g., on-demand module 164A, on-premise module 164B, and/or any other system, component, and/or application) directly (e.g., peer-to-peer) or via a directory; determine user identities or an identity of a group of users either directly or via a central identity management system 162; obtain users authorizations; generate a default authorization proposal for a user or a user group based on prior authorization in another system (e.g., based on a semantic tag and authorization history in another system); provide segregation of duties for users/user groups; and/or monitoring of segregated duties (e.g., using triggers, browsing/classifying segregation of duty alerts, browsing and presenting authorization histories for traceability and accounting).

The authorization management application manager 182 receives requests from one or more, if not all, of the connected components of system 190, such as user interface 110 and/or modules 164A-C. The authorization management application manager 182 may route a received request to an appropriate service provider, and, in some implementations, the authorization management application manager 182 may transform, or enrich the received request with additional metadata, before routing the request to another module of system 190. For example, when authorization server 180 receives a request to get default authorization proposals, the request is transformed to two requests, which are addressed separately to tags and rules definition 184B. The results may then be merged by authorization server 180 and the request is answered with a response.

Table 3 depicts the inputs and outputs of authorization management application manager 182, such as the name of a user (e.g., In_User) or user group (e.g., In_User_Group), a name identifying a component (e.g., a system, a module, and the like) for which authorization is being managed (e.g., In_Networked_App), and a list of users or groups authorized for the identified component (e.g., Out_Authorizations). Table 3 shows an example of a function/method used to get authorizations granted for a user or group of user in an on demand or on premise system. An input to the function/method is user name or a group of users (e.g., user "Said" or groups of user such as "sales reps)). Networked application is an example of a system name (e.g., a name for on-demand system 164A), and Out_authorizations is an example of the authorizations granted to the user/user groups in the system.

TABLE 3

| Get_Authorization_Assignments | | CL_Application_Manager |
|---|---|---|
| | Exporting | |
| IN_User | String | User Name |
| IN_User_Group | String | User Group Name |
| IN_Networked_App | NWA_Name | Name identifying a networked application which part of a networked solution |
| OUT_Authorizations | Authorization_Table | List containing current authorization s in the system for a user or user group |

Table 4 depicts authorization assignments for a certain user and/or user group.

TABLE 4

| Set_Authorization_Assignments | | CL_Application_Manager |
|---|---|---|
| | Exporting | |
| IN_User | String | User Name |
| IN_User_Group | String | User Group Name |
| IN_Networked_App | NWA_Name | Name identifying a networked application which part of a networked solution |
| IN_Authorizations | Authorization_Table | List containing authorization for a user or user group which shall be set in the local system |

Table 5 depicts parameters of the method or function used in the central authorizations system via an administrator to set authorizations for a specific user or user group in a specific system (e.g., an on demand or on premise).

TABLE 5

| get_Authorization_Proposal | | CL_Application_Manager |
|---|---|---|
| | Exporting | |
| IN_User | String | User Name |
| IN_User_Group | String | User Group Name |
| OUT_Authorizations_Proposal | Authorization_Table | List containing authorization Proposal for a user or user group which shall be maintained |

Table 5 depicts parameters of methods or functions used to get authorization default settings for a specific user or user group. The default authorizations may be derived from the authorization already granted in another system. For example, an authorization for module 164A may be used across systems at module 164B. The default authorizations may be used to ease the administration of authorizations for different user in different system of networked business solutions. For example, when a networked solution consists of three systems (e.g., on demand, on premise, and an extension system "AD-System"), the networked solution administrator may provide the user/user group of the networked business solution with the proper authorizations to access the three systems. To ease this task, an authorizations proposal (see, e.g., Table 5) may be generated by the central authorization server 180 based on authorizations previously granted to the user/user groups in the three systems noted above. The authorizations in these three systems may be stored in tags and rules definition 184B

TABLE 6

| Get_User_Details | | IF_Service_Dispatcher |
|---|---|---|
| | Exporting | |
| IN_User | String | User Name (exposed in the local authorization assignment) |
| IN_User_Group | String | User Group Name |
| OUT_User_Detalies | Authorization_Table | List containing details for a user or user group provided in the local system for better identifying of the user |

Table 6 depicts a method or function to obtain user details, such as user relevant information including name, surname, address, position(s) in company, email, phone, and the like.

Table 7 below depicts a method/function to get alerts created and stored in the authorization server 180 due to segregation of duty rules violation. The defined segregation of duty rules in tags and rules definition 184B may be violated when authorizations are granted to a user or a user group in a specific system/module. For example, the segregation of duty violations of a user/user group may be detected by authorization server 180 across systems, e.g., an on-demand module 164A and an on-premise module 164B.

TABLE 7

| Get_Alerts | | CL_Application_Manager |
|---|---|---|
| Exporting | | |
| OUT_Alert_List | RefToTable | Table containing the references of all Alerts data |

The dispatcher 198A is configured to route any received calls to the authorization management application manager 182 and forward and calls from within authorization server 180 to another entity, such as user interface 110, modules 164A-C, and central identity manager 162. The dispatcher 198A may include a queue and a buffer to handle calls.

The semantic tagging service provider 184A may be configured to provide the data and logic for mapping technical authorization entities to a unified semantic authorization entity. The semantic tagging service provider 184A may also be configured to derive and identify segregation of duty alerts. For example, semantic tag service provider 184A may be used to define segregation of duty rules. The defined rules may be stored in tag and rules definition 184B. When segregation of duty rules are defined, the semantic tag used to define authorizations (e.g., business role, business activity, and the like) are referenced. The segregation of duty rule may be defined, for example, on business activity level, such as separation between purchase order create/update and an inbound-delivery confirmation. As such, when a user is authorized to create or update a purchase order in system A (e.g., on-demand module 164A), the same user is also authorized to create an in-bound delivery confirmation in system B (e.g., on premise module 164B) which belongs to the same networked solution. The segregation of duty violation may be detected and a corresponding alert is created, when a segregation of duty violation occurs across systems (e.g., modules 164A-C and the like). Segregation of duty rules may be also defined on the business roles level such as a purchaser and an in-bound delivery agent. The rules may also be extended to contain, for example, invoice processing and payables management in accounting area.

The semantic tagging service provider 184A may be implemented to include a model and a service provider. The model may provide tag definitions and tag storage, and may be implemented at tag and rules definition 184B. A tag definition and its corresponding description may provide an abstraction of the technical authorization entities. A technical authorization entity may be defined based on another technical entity without a direct relationship to a business domain. The tag definition may be created so that it is generic and thus be used as a common, semantic tag (or language) that it can be used across different systems. For example, a first business system may authorize a user's access to a system or a module therein based on the technical authorization entities assigned to the user, while other systems may grant a user authorization based on so-called "work centers," which correspond to groups of user interface elements need to execute a specific tasks related to a business position/role, such as sales representative. To illustrate further, the tag definition would correspond to a generic, semantic tag, which would be mapped to both the user role and work center.

The model of the semantic tagging service provider 184A may include one or more rules including the storage of rules. Some of the rules may define the mapping between the authorization systems (e.g., Central Authorization-Business Role to work center tags), and some may define segregation of duty rules. For example, a rule may define that authorization for access to a purchase order processing and access to invoice processing may be flagged as prohibited as a possible fraud since these roles are often separate when accounting best practices are followed. The model of the semantic tagging service provider 184A may also provide an internal service or method, which can be called by authorization management application manager 182 to check for such segregation of duty alerts. The check may be executed based on rules and tags defined in the model. The semantic tagging service provider 184A may also include setter and getter methods to define and retrieve semantic tags, rules, and/or segregation of duty rules.

Table 8 depicts the function/method used to check if a segregation of duty violation may be caused due to a new assignment of authorizations. For example, "In_assigned_tag_list" contains a holistic list of authorizations that will be assigned to a user or a user group (e.g., assigned authorizations and new to be assigned authorizations), and the called function/method of Table 8 compares the list with the segregation of duty rules stored in tags and rules definition 184B and returns the potential violations "in Out_Alert_List."

TABLE 8

| Check for Alert | | CL_Sementical_Tagging_SP |
|---|---|---|
| Exporting | | |
| IN_Assigend_Tag_List | RefToTable | List containing assigned tag for a user or user Group |
| OUT_Alert_List | RefToTable | Table containing the references of all Alerts data |

The authorization history service provider 186A may be configured to store the assigned authorization for each user, or user group, for each business system being managed by system 190. For example, the business system being managed may include modules 164A-C, and, in this example, the authorization history service provider 186A may store information representative of which users/groups of users are authorized to access and/or use modules 164A-C. This stored information may be used via authorization manager 182 to derive default authorization proposals and support authorization traceability for auditing purposes.

Table 9 depicts a method/function for getting authorizations assigned to a user or user group in a business networked solution having on demand and/or on premise modules/systems. "In_user" may contains the name of the user whose authorizations shall be retrieved. "Out_assigned Auth" may return all authorizations the user (provided in in_user) may have in all systems that are part of the networked business solution. The authorizations may be described in the common authorization format defined in tags and rules definition 184B.

TABLE 9

| Get_history | | CL_Authorization_History_SP |
|---|---|---|
| Exporting | | |
| IN_User | String | User Name |
| IN_user_Group | String | User group Name |
| OUT_Assigned_Auth | Autho_Table | List containing all historical authorization assignments |

The notification and alert service provider 188A may create segregation of duty alerts when a user and/or group of users are authorized access to a module that they should not have access to. When there is a segregation of duty alert indicating a violation, the notification and alert service provider 188A may send the aggregation of duty alert to user interface 110 and/or an alert log 188B for auditing and traceability. In some implementations, a user, such as an administrator, may be presented with the segregation of duty alerts via user interface 110 or by viewing alert log 188B. The alert may indicate that a certain user should not have access to a module, such as for example module 164C. When an alert is received, the user may select and then close an alert by changing the assigned authorization or by classifying the alert as incorrect. The notification and alert service provider 188A may also provide setter and getter methods which are called by the authorization management application manager 182.

Table 10 depicts inputs to, and outputs of, the notification and alert service provider 188A. The inputs include input values for a user (e.g., IN_User) and/or a user group (e.g., IN_User_Group), and the output includes a history of alerts (e.g., OUT_Alerts) for the user and/or user group. The history of alerts may be stored in alerts log 188B and obtained by calling alert and notification service provider 188A. The history of alerts information may be used to resolve a segregation of duty violation during the assignment of an authorization to a user/user group assignment, and/or may be used in the auditing process to detect segregation of duty violations.

TABLE 10

| Get_alerts_history | | CL_Alerts_SP |
|---|---|---|
| Exporting | | |
| IN_User | String | User Name |
| IN_User_Group | String | User group Name |
| OUT_Alerts | Alerts_Table | List containing all historical alerts for user or user group |

The service manager 192 (labeled REST Services Manager) manages a bundle of services available at authorization server 180. The service manager 192 may be implemented in accordance with REST (representational state transfer), although other protocols may be used, such as for example SOAP (simple object access protocol). The defined services (exposed and callable services) may be REST-based services reachable over the Internet (or other network) by specifying a certain uniform resource locator (URL) for a service being called.

The subcomponent REST service dispatcher 194 transforms and maps internal methods calls invoked by the authorization management application manager 182 to, for example, REST service calls.

The service exposer 196 may be configured to expose a bundle of services, such as REST services, invoked by the by the authorization management application manager 182 in order to provide the system 190 with information needed to provide authorization (inbound services). The services definitions and URLs 198B and endpoints configurations 172 for the exposed services may be manually configured or automatically pulled from a solution directory component. Additionally, the service exposer 196 may transform an inbound service call to an internal method call on different components of the authorization management system 190.

Table 11 depicts the inputs to the service exposer 196. The inputs include a user identity (e.g., IN_User), and/or group of users (e.g., IN_User_Group), and a list of authorization changes (e.g., IN_Authorizations) for the user and/or group. The authorization changes are the authorizations assigned to a user or/and user group locally in a system, such as 164A/B/C. The local authorization changes are published to the central authorizations system 190 via invocation of the appropriate exposed Web or Rest Service in service definitions and URLs 198B. The semantical common authorizations may be described and formulated using the common language defined and stored in tags and rules definition 184B.

TABLE 11

| Notify_Authorization_Change | | IF_Service_Exposer |
|---|---|---|
| Exporting | | |
| IN_User | String | User Name |
| IN_User_Group | String | User Group Name |
| IN_Authorizations | Authorization_Table | List containing authorization changes for a user or user group |

The notify authorization change service is called via the service exposer 196 by an application/system when the authorization of a user or user group is changed or newly created locally/directly in the system such as 164A/B/C. The authorization management application manager 182 dispatches this information to all relevant subcomponents of the system 190, such as authorization history service provider 186A and notification and alert service provider 188A. The service exposer 196 may be called to get the common semantical authorizations definition The common semantical authorizations definition service (which is called via the service exposer 196) provides the standard authorization name and definition which may be used by involved modules (e.g., systems, applications, and the like) to provide a unified semantic authorization assignment.

Table 12 depicts a method/function for obtaining semantical tags from tags and rules definition 184B.

TABLE 12

| Get_Semantical_Tags | | IF_Service_Exposer |
|---|---|---|
| Exporting | | |
| OUT_Tags | Tag_Table | List of defined Tags with name and business decription |

The service dispatcher 194 is called as depicted at Table 13 below.

TABLE 13

| Get_Authorization_Assignments | | IF_Service_Dispatcher |
|---|---|---|
| Exporting | | |
| IN_User | String | User Name |
| IN_User_Group | String | User Group Name |

TABLE 13-continued

| Get_Authorization_Assignments | | IF_Service_Dispatcher |
|---|---|---|
| OUT_Authorizations | Authorization_Table | List containing current authorization s in the system for a user or user group |

Table 13 depicts a function/method which is called by the central authorization server 190 to get authorizations assigned to a user or/and user group in a system, such as modules 164A/B/C. This function/method may be called in an authorization consolidation process to collect all authorization assignments in different system and then stored those authorizations in 190 with a harmonized common semantical authorizations format.

TABLE 14

| Get_Local_Tags | | IF_Service_Dispatcher |
|---|---|---|
| Exporting | | |
| OUT_local_tags | Tag_Table | List containing tags used and known in the local system/application |

Table 14 depicts the get local tags service (which is called via the REST service manager 192) and is invoked via the central authorizations system 190 to get a list of available semantical authorizations which may be assigned to a user in a system/application, such as systems 164A/B/C where the service was invoked. For example, if the service was invoked in system/module 164A, the get local tags service returns possible semantical authorization that can be assigned to a user or/and user group in the system/module 164A. The possible authorizations may be defined by the business processes scope covered in the system (e.g. sales force automation). When default authorizations are generated in the system 190 for a user or user group in system/module 164A, the list of possible authorizations is returned back by get_local_tag (Table 14).

Table 15 depicts a function/method for assigning authorizations to a user or user group in a system (e.g., modules 164A-C) using the central authorization system 190.

TABLE 15

| Set_Authorization_Assignments | | IF_Service_Dispatcher |
|---|---|---|
| Exporting | | |
| IN_User | String | User Name |
| IN_User_Group | String | User Group Name |
| IN_Authorizations | Authorization_Table | List containing authorization for a user or user group which shall be set in the local system |

Table 16 depicts a get user details (which is called via the REST service manager 192) to allow local user mapping in the system 190 when a central identity management system is not available or not used. For example, suppose a Karl Mustermann has two different user identities MustermannK and KMusterman2011 in system 164A and in system 164B another identity, KarlMusterM. The administrator using system 190 may recognize that all of these identities belong to the same person by invoking the function shown in Table 16 as additional information for a user may be returned to allow identifying the user (and in the case of the example identifying them as the same person). The returned data may include name, surname, employee ID, etc.

TABLE 16

| Get_User_Details | | IF_Service_Dispatcher |
|---|---|---|
| Exporting | | |
| IN_User | String | User Name (exposed in the local authorization assignment) |
| IN_User_Group | String | User Group Name |
| OUT_User_Detalies | Authorization_Table | List containing details for a user or user group provided in the local system for better identifying of the user |

Table 17 depicts the inputs and outputs of a get user service (which is called via the REST service manager 192) called when a central identity management system is available. The central identity management provides a harmonized view of users available in the different systems. This harmonized view eases the task of the central system 190.

TABLE 17

| Get_User | | IF_Service_Dispatcher |
|---|---|---|
| Exporting | | |
| IN_System | String | User Name (exposed in the local authorization assignment) |
| OUT_User | User_Table | List containing user or user group provided in the specified system |

Figure 2:
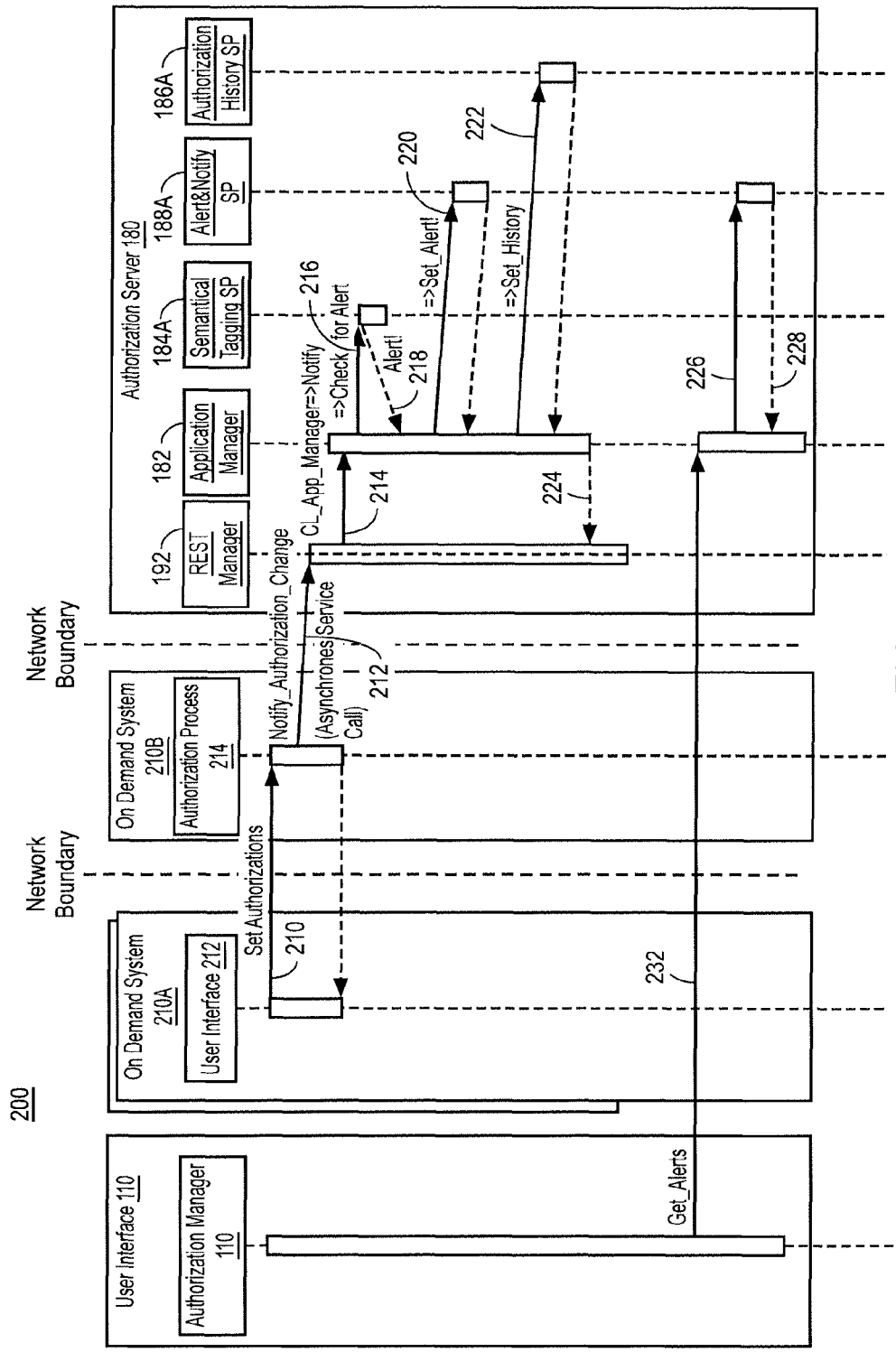
FIG. 2 depicts an example of a sequence diagram for creating and getting alerts.

FIG. 2 depicts an example of a sequence diagram including a process 200 for changing authorizations for a user and/or user group in a system (e.g., modules 164A-C), publishing the changes to a central authorization system 190, detecting a segregation of duty violation and creating corresponding alerts, and sending those alerts on request to the user interface of the central authorization system 190. For example, a user (e.g., on demand system 210A/B administrator) at user interface 212 may assign authorizations such as "sale order processor authorizations" for a user/group of users in system 210A/B.

At 210, a set authorization message is received at an authorization process 214 of a system, such as on-demand system 210B. At 212, the on-demand system 210B system sends a notify authorization change message to service manager 192, where a notification message 214 is sent to authorization management application manager 182. At 216, the application manager 182 sends a check for an alert message to semantic tagging service provider 184A, where an alert is returned at 218 indicating a violation of a segregation of duty rule. When the alert 218 is received, the alert is sent at 220 to notification and alert service provider 188A to document and log the creation of the alert. At 222, authorization history service provider 186A is invoked and the new authorizations assignment is logged. Next, the authorization management application manager 182 returns at 224 local authorizations assignments done at 210B, which are then published to the authorization server 180 and any authorization changes are logged/stored in the authorization history service provider 186A. Additionally, the segregation of duty violation caused by the newly assigned authorizations is detected and the corresponding alert is created and logged/stored in the alert and notify service provider 188A.

At 232, a request for alert retrieval may be sent from the user interface 110 to the application manager 182 (e.g., an administrator of the central authorizations system 190 may want to display/monitor segregation of duty alerts created for a networked business solution). At 226, the application manager 182 may invoke the alert and notification service provider 188A to obtain the alerts stored there and sends those alerts to the user interface 110.

Figure 3:
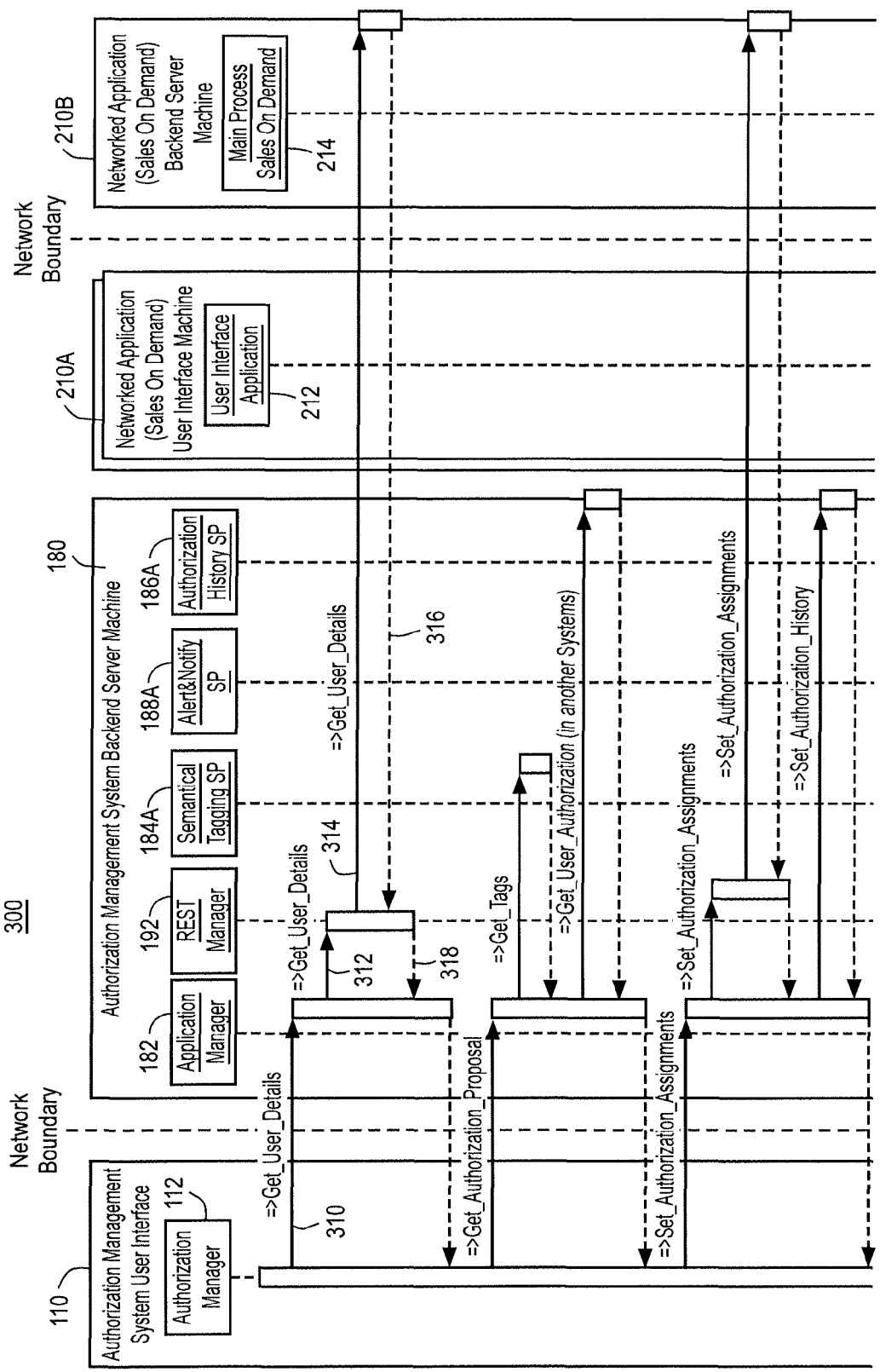
FIG. 3 depicts an example of a sequence diagram for setting authorizations.

FIG. 3 depicts an outbound call to set authorizations from the central authorizations system 190 in an on demand system 210B. At 310, the application manager 182 receives a message requesting user details. For example, a user at user interface 110 may configure authorizations to allow access to a system (e.g., modules 164A, B, or C) to a user or group of users via process 300.

At 312, the application manager 182 sends the received message to REST service manager 192. At 314, the REST service manager 192 calls a components, such as on-demand system 210B to obtain user details (or information) for a user being authorized. At 316 and 318, the on-demand system 210B returns the user details to the application manager 182.

In this sequence diagram of FIG. 3, the administrator of the central authorization system may assign authorizations to a user or user group in an on demand system (e.g., system/module 210B). In this example, the administrator may use user interface 110 of system 190 to assign the authorizations. The user details are obtained via the REST service manager 192 which obtains information from other systems (e.g., other modules). Next, the administrator may invoke a function/method in 180 to get an authorizations proposal for the user/user group. The authorizations proposal may then be calculated based on possible authorization in the system 210B and based on the authorizations history for the user in the other systems. Therefore, these two sub-calls are done via the application manager 182 to the tagging service provider 184A and authorization history service provider 186A. Once the authorizations proposal is calculated and returned back by the application manager 182, the authorizations are assigned to the user (via user interface 110 and through REST service manager 192) in the system 210B, and the new authorization assignment is documented/stored/logged in authorization history service provider 186A.

Figure 4:
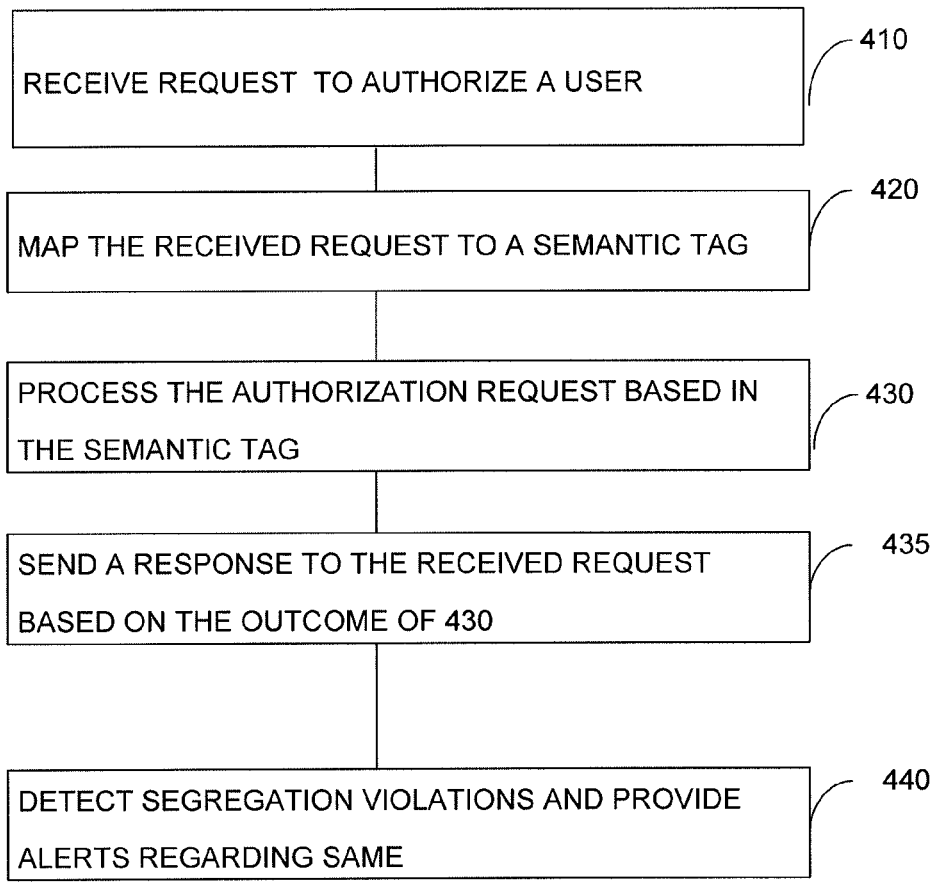
FIG. 4 depicts a process for authorization management.

FIG. 4 depicts a process 400 for authorization management.

At 410, a request may be received to authorize at least one user to access a module of a system. For example, authorization management application manager 182 may receive a message from authorization manager 112. The message may request that at least one user be authorized access to on-premises module 164B and on-demand module 164C. The authorization management application manager 182 may access central identity manager 162 to obtain identity information to identify unambiguously the user in relevant systems.

At 420, the request may be mapped to a semantic tag. For example, the request including the identity information for the at least one user may be mapped to a common, semantic tag. For example, the identity of the user may include the role information, which may be mapped into a common, semantic tag. For example, if a user in the request has a role of invoice processor that role may be mapped into a semantic tag, such as accounting. invoices.

At 430, the semantic tag may be processed to determine whether the request to access the module should be authorized. For example, the semantic tag may be processed by semantic tag service provider 184A and tag and rules definition 184B to determine whether access should be granted.

Returning to the previous example of the semantic tag of accounting.invoices, a rule in the tag and rules definition may define whether someone with a semantic tag of accounting-.invoices should be granted access to on-premises module 164B. If the rule says yes (or there is not a segregation flag prohibiting access to the module 174B), the access to on-premises module 164B may be granted.

At 435, a response is sent indicating whether the at least one user is authorized access to the module of the system. For example, the authorization management application manager 182 may send a message to authorization manager 112, and the message may indicate that the at least one user is granted access to on-premises module 164B as request in 410. In some implementations, authorization management application manager 182 may provide the message and include metadata configured to automatically authorize the at least one user in accordance with the language/conventions used by on-premises module 164B.

At 440, segregation violation may be detected. For example, authorization server 180 may determine segregation of rules violations based on tagging and rules definitions 184B across systems (e.g., modules 164A-C). When such violations are detected, the authorization server 180 may report the violations to user interface 110 and/or another processor.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet. As used herein, the term "module" refers to at least one processor and at least one memory including code which when executed by the at least one processor configures the module.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable storage medium containing instructions to configure at least one processor to cause operations comprising:
   receiving a request to authorize at least one user to at least one module of a system;
   determining at least one of a role or a work center of the at least one user;
   mapping, based on the determining, the received request in a first format to a semantic tag in a common format, wherein the common format indicates the at least one of the role or the work center;
   processing, based on the semantic tag in the common format, the request to authorize the at least one user to determine whether to grant the at least one user access to the at least one module; and
   detecting, based on at least one segregation of duty rule, whether the request by the at least one user poses a segregation of duty violation, wherein the at least one segregation of duty rule represents a rule to segregate an action indicated by the received request from the determined at least one of the role or the work center of the at least one user; and
   authorizing, when the processing grants the access and the segregation of duty violation is not detected, the at least one user access to the at least one module;
   sending a first message indicating the authorizing, when the processing grants the access and the segregation of duty violation is not detected;
   sending a second message indicating access is not granted, when at least one of the processing does not grant the access or the segregation of duty violation is detected.

2. The computer-readable storage medium of claim 1, wherein the at least one module is implemented as at least one of an on-premises module and an on-demand module.

3. The computer-readable storage medium of claim 1 further comprising:
   converting the first message to at least one of the first format or a second format before sending the first message.

4. A method comprising:
   receiving a request to authorize at least one user to at least one module of a system;
   determining at least one of a role or a work center of the at least one user;
   mapping, based on the determining, the received request in a first format to a semantic tag in a common format, wherein the common format indicates the at least one of the role or the work center;
   processing, based on the semantic tag in the common format, the request to authorize the at least one user to determine whether to grant the at least one user access to the at least one module; and
   detecting, based on at least one segregation of duty rule, whether the request by the at least one user poses a segregation of duty violation, wherein the at least one segregation of duty rule represents a rule to segregate an action indicated by the received request from the determined at least one of the role or the work center of the at least one user; and
   authorizing, when the processing grants the access and the segregation of duty violation is not detected, the at least one user access to the at least one module;
   sending a first message indicating the authorizing, when the processing grants the access and the segregation of duty violation is not detected;
   sending a second message indicating access is not granted, when at least one of the processing does not grant the access or the segregation of duty violation is detected.

5. The method of claim 4, wherein the at least one module is implemented as at least one of an on-premises module and an on-demand module.

6. The method of claim 4 further comprising:
   converting the first message to at least one of the first format or a second format before sending the first message.

7. A system comprising:
   at least one processor; and
   at least one memory including code which when executed by the at least one processor causes operations comprising:
   receiving a request to authorize at least one user to at least one module of a system;
   determining at least one of a role or a work center of the at least one user;
   mapping, based on the determining, the received request in a first format to a semantic tag in a common format, wherein the common format indicates the at least one of the role or the work center;
   processing, based on the semantic tag in the common format, the request to authorize the at least one user to determine whether to grant the at least one user access to the at least one module; and
   detecting, based on at least one segregation of duty rule, whether the request by the at least one user poses a segregation of duty violation, wherein the at least one segregation of duty rule represents a rule to segregate an action indicated by the received request from the determined at least one of the role or the work center of the at least one user; and
   authorizing, when the processing grants the access and the segregation of duty violation is not detected, the at least one user access to the at least one module;
   sending a first message indicating the authorizing, when the processing grants the access and the segregation of duty violation is not detected;
   sending a second message indicating access is not granted, when at least one of the processing does not grant the access or the segregation of duty violation is detected.

8. The system of claim 7, wherein the at least one module is implemented as at least one of an on-premises module and an on-demand module.

9. The system of claim 7 further comprising:
converting the first message to at least one of the first format or a second format before sending the first message.

* * * * *